United States Patent
Tsappi (12) 
(10) Patent No.: US 6,371,432 B1
(45) Date of Patent: Apr. 16, 2002

US006371432B1

(54) SUPPORT DEVICE

(76) Inventor: Philip Tsappi, 24 Alder Grove, Cricklewood, London NW2 7DB (GB)

(*) Notice: Subject to any disclaimer, the term of this patent is extended or adjusted under 35 U.S.C. 154(b) by 0 days.

(21) Appl. No.: 09/297,664

(22) PCT Filed: Nov. 15, 1996

(86) PCT No.: PCT/GB96/02816

§ 371 Date: Apr. 30, 1999

§ 102(e) Date: Apr. 30, 1999

(87) PCT Pub. No.: WO98/21431

PCT Pub. Date: May 22, 1998

(30) Foreign Application Priority Data

Nov. 8, 1996 (GB) .............................................. 9623404

(51) Int. Cl.⁷ .............................................. F16M 13/00
(52) U.S. Cl. ...................... 248/523; 248/158; 248/519; 248/530; 47/42
(58) Field of Search ................................ 248/523, 524, 248/525, 527, 529, 530, 533, 539, 540, 541; 47/42, 43, 158

(56) References Cited

U.S. PATENT DOCUMENTS

| 1,463,734 A | * | 7/1923 | Ullrich |
| 1,732,284 A | * | 10/1929 | Schulze |
| 3,838,838 A | * | 10/1974 | Seaman, Jr. ................... 248/44 |
| 4,989,820 A | * | 2/1991 | Sterling ...................... 47/42 X |
| 5,725,193 A | * | 3/1998 | Adams ......................... 248/523 |
| 5,870,858 A | * | 2/1999 | Manuel ....................... 47/40.5 |
| 6,032,408 A | * | 3/2000 | Nielsen ......................... 47/42 |
| 6,123,311 A | * | 9/2000 | Trinier ........................ 248/530 |

FOREIGN PATENT DOCUMENTS

| DE | 30 14 818 | * | 10/1981 |
| DE | 3442 581 | * | 5/1986 |
| DE | 88 14 845 | * | 2/1990 |
| DE | 296 24 999 | * | 11/1996 |
| GB | 2174597 | * | 11/1986 |
| GB | 2262881 | * | 7/1993 |
| WO | WO 90/08493 | * | 11/1986 |

\* cited by examiner

*Primary Examiner*—Anita King
*Assistant Examiner*—Korie Chan (57) ABSTRACT

A support device for supporting a substantially vertical pole comprises a two-part collar (1) defining a central passage (6) therethrough. The parts of the collar may be releasibly secured together, thereby allowing a collar to be fitted around a pole. The support device further comprises a plurality of legs (8, 9) adapted to support the collar above the lowermost ends of the legs and with the central passage thereof substantially vertical.

15 Claims, 11 Drawing Sheets

SUPPORT DEVICE

TECHNICAL FIELD

THE PRESENT INVENTION relates to a support device for supporting a substantially vertical pole. Such a pole may, for instance, be the stem of a plant, the trunk of a tree, the central pole or trunk of a Christmas tree, the central pole or tube housing the pole of an umbrella or the shaft of a rotary clothes line. Thus in this specification the word pole is used with a very broad meaning.

BACKGROUND ART

It is known to provide support to the stems of plants such as tomatoes, cucumbers, runner beans etc., and to support saplings throughout their early stages of growth.

A commonly used method of supporting plant stems is to use lengths of bamboo cane inserted vertically into the ground next to the plant, and to loosely tie the stem of the plant to the cane in stages as the plant grows. A variety of means such as string, metal rings or plastic tie wraps may be used for this purpose. However, a common problem when using such bamboo canes, is that they provide only limited support in windy conditions, the canes themselves being easily damaged.

It is now common practice to grow tomatoes and cucumbers in a standard size growbag containing soil and nutrients. Supporting plants growing in growbags is problematic, as a bamboo cane either has to pierce the bag which can result in loss of soil and nutrients during repeated watering of the plant, or has to be inserted into the surrounding ground at a substantial angle, thus offering inadequate support.

Young trees, when planted, need to be supported to prevent damage from wind and to encourage substantially vertical growth. A stake inserted into the ground, and a flexible band wrapped around the trunk and secured to the stake is a commonly used method of supporting such trees. As the tree grows, the flexible band accommodates the increase in the trunk's dimension. In order to provide increased support, commercial forestry organisations frequently use a plastic tube wrapped around the tree trunk and inserted into the ground. Whilst such plastic tubes provide good support in all radial directions, with the added benefit of protecting the sapling from damage by wild animals, they are impractical for domestic application. As the sapling grows, the tube will begin to constrain its growth and must be removed. The removal of such tubes involves cutting them free from the sapling, thus making incapable of reuse.

Large garden umbrellas or the like are usually supported by inserting the central umbrella pole through a central aperture formed in a garden table. The lower end of this pole is then inserted into container, via an aperture therein. The container is situated below the table and is usually filled with water or sand for added stability. However, in the absence of the table, this method of support is inadequate for supporting the considerable weight of an umbrella.

Commonly used methods for supporting a rotary clothes line comprise inserting a length of tube or a spike into the ground. In the case of concrete patios, this involves a permanent installation which can not be moved. In the case of inserting a tube or spike into a lawn, it is especially advantageous to be able to vary the position of the clothes line so that particular areas of the lawn do not get worn due to constant treading. Also, in wet weather, the ground becomes wet and muddy, resulting in the possibility of the installation working loose which is obviously disadvantageous.

Free standing supports for Christmas trees are available in many forms. However, for supporting a Christmas tree within a non-custom built receptable two methods are currently used; the trunk is surrounded by bricks or stones of if the receptacle is made of wood, the bottom of the trunk is nailed to the bottom of the receptacle and supported by two lengths of timber whose ends are nailed to the receptacle and on either side of the trunk. The first method does not secure the tree safely and the second, apart from being time consuming, requires some considerable skill with possible damage to the receptacle.

The present invention therefore seeks to provide an improved support device.

DISCLOSURE OF INVENTION

According to one aspect of this invention there is provided a support device for supporting at least one substantially vertical pole, said support device comprising a collar defining a central passage therethrough, said collar comprising at least two collar elements each element comprising a sector of said collar having a pair of substantially flat radially and longitudinally extending faces each engageable with the corresponding flat face of an adjacent collar element, the elements being associated with securing means comprising at least one tab projecting from each said flat face of each said collar element, the or each tab being engagable within a corresponding recess formed in each said corresponding flat face of an adjoining collar element to releasibly secure the said collar element together, and a plurality of legs communicating with said collar elements, the legs being adapted to support said collar with the central passage thereof substantially vertical, the collar being positioned above the lowermost ends of said legs.

Advantageously said collar is provided with at least one resiliently deformable element secured thereto, the or each resiliently deformable element having at least one surface adapted to be in contact with said pole to provide support to the pole whilst allowing limited movement of pole and to accommodate a small change in dimension of the pole.

Conveniently said collar is provided with a plurality of said resiliently deformable elements attached to the collar in an annular configuration, there being a radial cut therein to facilitate figment around said pole.

Preferably the support device comprises a plurality of said collars in a substantially horizontal array, to provide support to a plurality of substantially vertical poles.

Advantageously each collar is connected to at least one neighbouring collar via a connecting member.

Conveniently at least one additional collar is provided and is disposed above at least one of the or each collar.

Preferably the or each additional collar is connected to the collar immediately therebelow via a connecting member.

According to another aspect of this invention, there is provided a support device for supporting a substantially vertical pole, said support device comprising a frame structure carrying a plurality of radially inwardly biased supporting elements, each of said supporting elements being engageable with said pole to provide a support to the pole whilst accommodating a change in dimensions of the pole.

Preferably said frame structure comprises a collar defining a central passage therethrough and a plurality of legs, the legs being adapted to support said collar with the central passage thereof substantially vertical, the collar being positioned above the lowermost ends of said legs, Advantageously each of said supporting elements comprises a radially extending elongate plunger slidably engaged within an aperture in the collar and within a radially aligned aperture in an annular element communicating with the said collar, each plunger having an outer end and an inner end, the inner end being engagable with said pole and being associated with a spring to bias the plunger inwardly.

Conveniently said spring is a helical spring positioned around said plunger, one and of said helical spring being attached to the inner end of said plunger, the other end being engaged with said collar.

Preferably at least the outer end of said plunger is threaded and threadedly engaged with a nut, the nut having an inwardly directed face engaged with said annular element.

According to a further aspect of this invention, there is provided a support device for supporting a substantially vertical pole having a lower end, the support device comprising a collar defining a central passage therethrough, a plurality of legs, the legs being adapted to support said collar with the central passage thereof substantially vertical, the collar being positioned above the lowermost ends of said legs, locating means to locate and engage the said pole substantially centrally within the said collar, and mounting means to mount said pole such that the lower end thereof is positioned above the lowermost ends of said legs.

Preferably said locating means comprises a plurality of radially extending locating elements, each of said locating elements having an inner end engageable with said pole.

Advantageously each of said locating elements comprises a threaded shaft for threaded engagement within a corresponding threaded aperture in said collar.

Conveniently said mounting means comprises a substantially horizontal plate positioned below said collar to engage the lower end of said pole.

Preferably height adjusting means are provided to adjust the vertical position of said mounting plate relative to the lowermost ends of said legs.

Advantageously said height adjusting means comprises a plurality of apertures, each aperture being associated with said mounting plate and adapted to slidably receive a portion of one of said legs, means provided to releasibly secure said leg portion within said aperture.

According to yet another aspect of this invention, there is provided a support device for supporting a substantially vertical pole within an open-topped receptacle which has at least one upwardly extending side wall, the device comprising a collar defining a central passage therethrough, and a plurality of legs, the legs being adapted to support said collar with the central passage thereof substantially vertical, the collar being positioned above the lowermost end of said legs, the collar being provided with spacing means to locate the support device within said receptacle. Preferably said spacing means comprise at least one radially outwardly extending arm, said arm being engageable with the or each side wall.

According to a still further aspect of this invention, there is provided a support device for supporting substantially vertical pole within an open-topped receptacle which has at least one upwardly extending side wall, the device comprising a collar defining central passage therethrough and a plurality of radially outwardly extending arms, each of said arms being provided with engaging means to securely engage the or each side wall to support said collar with the central passage thereof substantially vertical, the collar being positioned above the lowermost end of the receptacle.

Preferably said engaging means comprises a radially outwardly directed spike located at the outer end of each arm and adapted to engage and penetrate the or each side wall and prevent relative movement therebetween.

Conveniently said engaging means comprises a non-slip pad located at the outer end of each arm and adapted to engage the or each side wall and prevent relative movement therebetween.

Advantageously adjusting means are provided to adjust the length of the or each arm.

Conveniently said adjusting means comprises a substantially elongate first arm portion and a second threaded arm portion, said threaded arm portion being threadedly engageable within said elongate first arm portion.

Preferably locating means are provided to locate and engage the said pole substantially centrally within the said collar.

Advantageously said locating means comprises a plurality of radially extending threaded shafts, threadedly engageable with said collar.

Conveniently each of said threaded shafts is provided with biasing means to bias the threaded shaft inwardly.

Preferably said biasing means comprises a helical spring.

According to yet a farther aspect of this invention, there is provided a support device for supporting a substantially vertical pole within an open-topped receptacle having at least one upwardly extending wall, the device comprising a substantially elongate arm, means to secure said elongate arm to an upper edge of at least one of said side walls, and means provided on the arm to engage the pole.

Preferably said means to secure the arm to said upper edge comprises a pair of spaced-apart tongues each of which tongues is adapted to engage an opposite face of said wall at its upper edge, at least one of said tongues being provided with a threaded aperture therethrough, and a threaded screw within said aperture engageable with the at least one tongue to clamp the upper edge of said wall between said tongue.

Advantageously said means to engage the pole comprises a substantially vertically extending flat plate having a threaded aperture therethrough and a threaded screw, threadedly engageable with said flat plate, and engageable with said substantially vertical pole.

BRIEF DESCRIPTION OF DRAWINGS

In order that the invention may be more readily understood, and so that further features thereof my be appreciated, the invention will now be described by way of example, with reference to the accompanying drawings in which.

MODES FOR CARRYING OUT THE INVENTION

Figure 1:
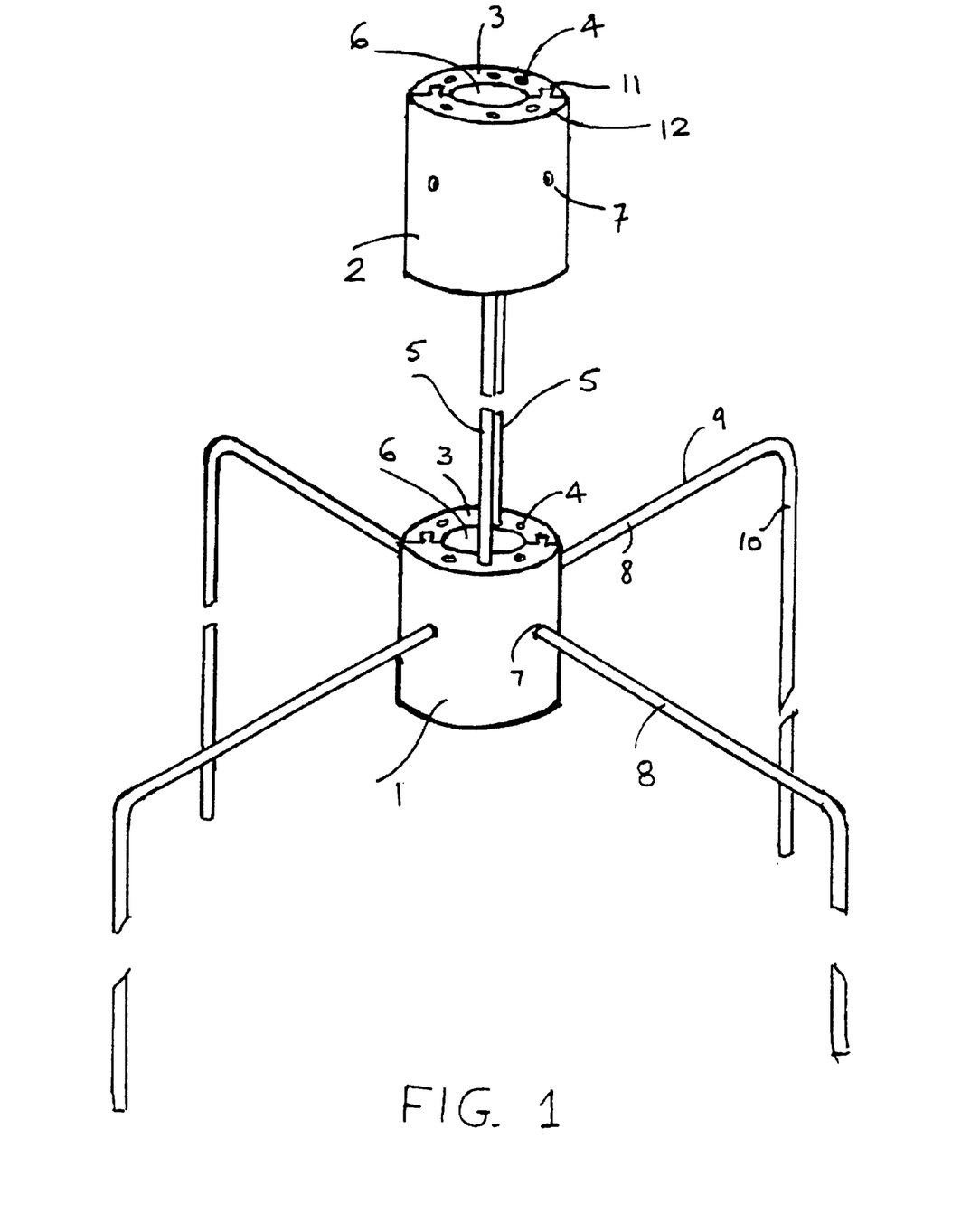
FIG. 1 is a perspective view of one embodiment of the support device of the invention.

Referring initially to FIG. 1 of the drawings, a support device is shown comprising a lower collar 1 of cylindrical form, and an additional optional upper collar 2, substantially identical to collar 1. Lower collar 1 and additional collar 2 each have a lower annular face (not shown) and an upper annular face 3, each face being provided with a plurality of apertures 4 therein. Additional collar 2 is located substantially vertically above lower collar 1 and is connected thereto via a pair of elongate connecting members 5. The lower ends of the connecting members 5 are inserted into apertures 4 in the upper annular face 3 of the lower collar 1, and the upper ends of the connecting members 5 are inserted into the corresponding apertures formed in the lower annular face of additional collar 2.

Collar 1 and collar 2 each define a substantially vertical central passage 6 therethrough, the central passage 6 being adapted to receive a substantially vertical pole, for instance the stem of a plant or the trunk of a tree.

Collar 1 and collar 2 are provided with a plurality of radial recesses 7 in their outer surfaces. As illustrated in FIG. 1, the lower collar 1 is further provided with a plurality of legs 8 each of which has a portion received within a recess 7. Each leg 8 has a substantially horizontal radially outwardly extending leg portion 9, and a further substantially vertical leg portion 10 remote from the collar 1. The substantially vertical leg portion 10 of each leg 8 extends substantially below the lower collar 1, such that the collar is positioned above the lowermost ends of legs 8. The legs serve to support the collar 1 with the central passage 6 thereof substantially vertical.

Each collar 1, 2 comprises a pair of collar elements 11, 12, each collar element comprising a half sector of collar 1 or collar 2.

Figure 2:
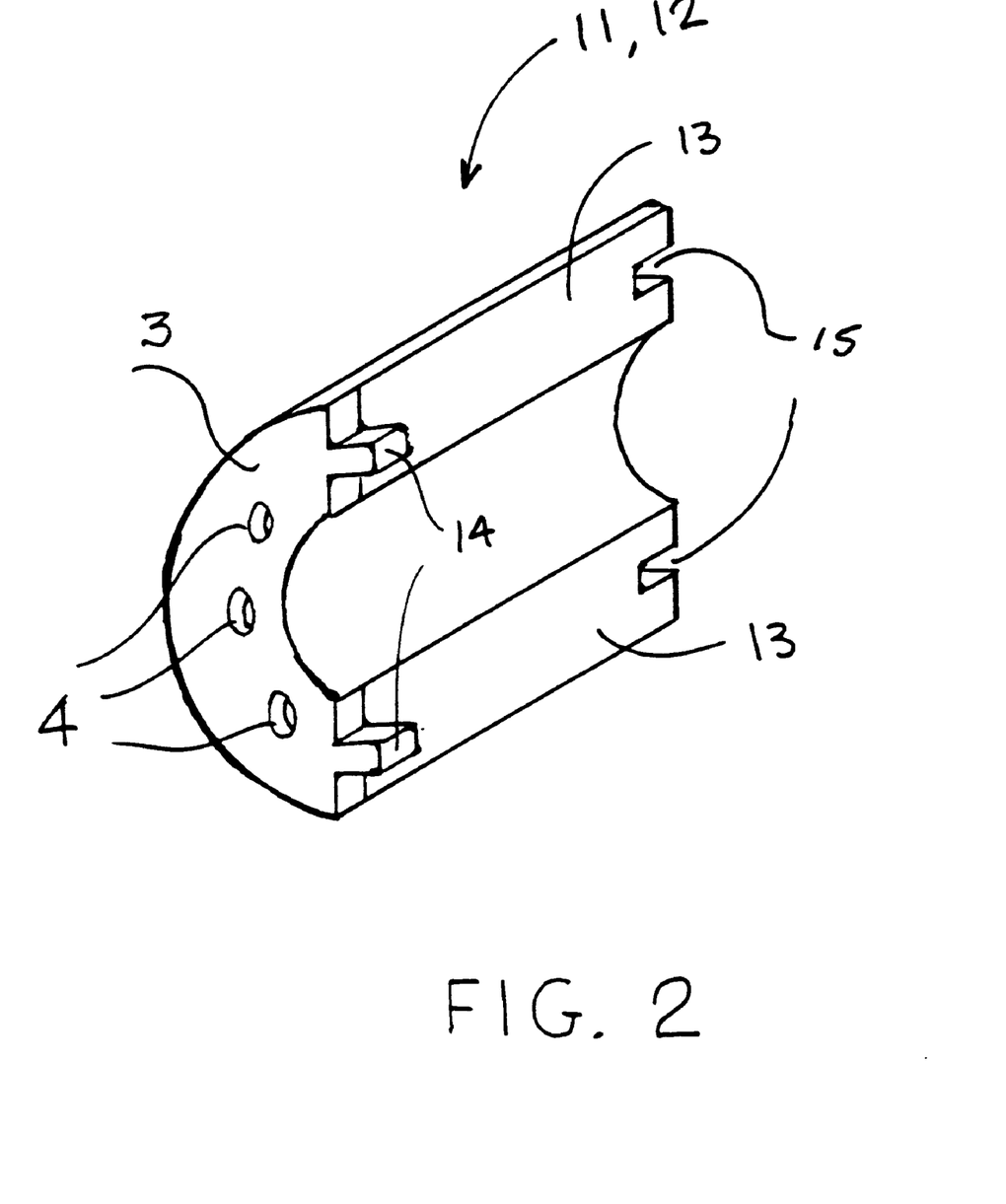
FIG. 2 is a perspective view of part of the support device of FIG. 1.

Turning briefly to FIG. 2 of the drawings, one collar element 11 or 12, is illustrated. Each collar element 11 or 12 is of substantially semi-circular axial cross-section and has a pair of substantially flat radially and longitudinally extending flat faces 13, engageable with the corresponding flat faces of the other collar element. Adjacent one end of collar element 11 or 12, there is provided a pair of projecting tabs 14, each tab 14 projecting substantially perpendicularly from a flat face 13. At the opposite end of the collar element 11 or 12, there is provided a pair of recesses 15 each formed within a respective flat face 13. Each recess 15 is adapted to receive a corresponding tab 14 formed on the other collar element. In this way, the tabs 14 and recesses 15 form means to releasibly secure the collar elements 11 and 12 together.

Figure 3:
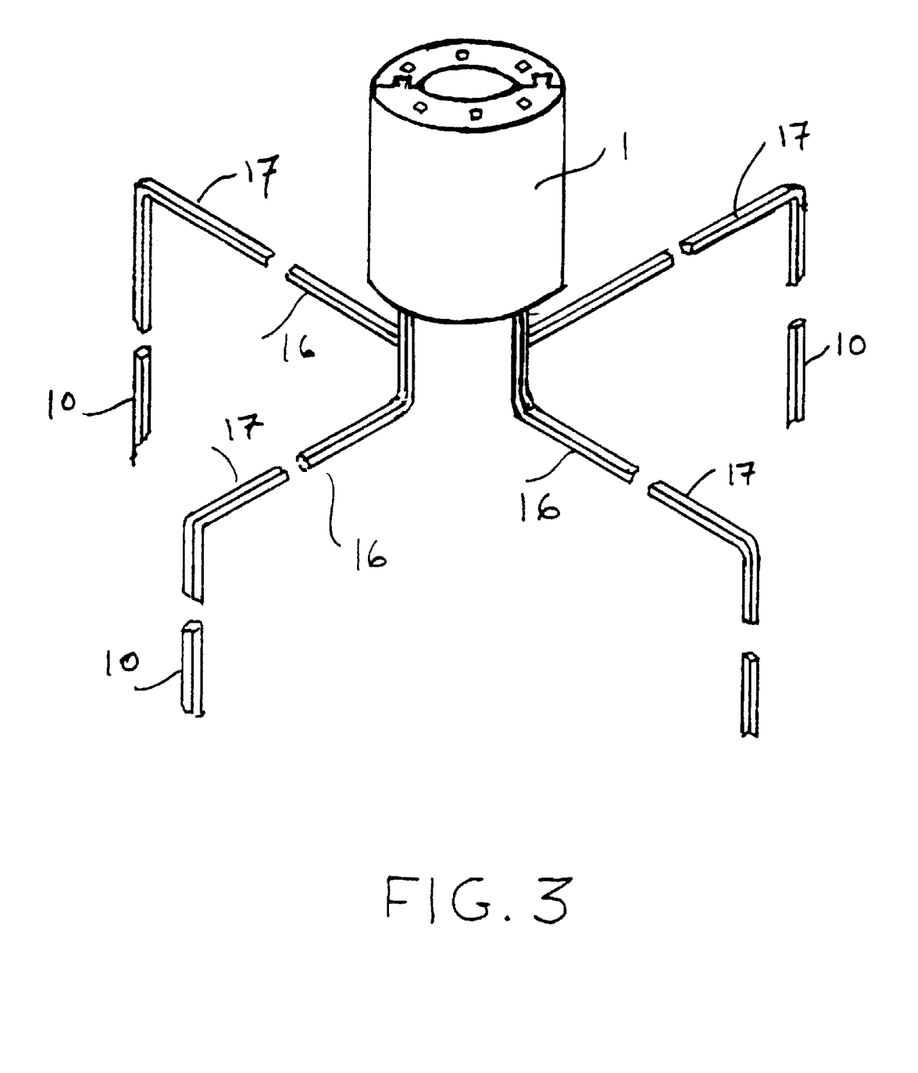
FIG. 3 is a perspective view of an alternative embodiment of the support device illustrated in FIG. 1.

Turning now to FIG. 3, an alternative embodiment of the present invention is illustrated. This embodiment incorporates a collar as described above and legs 16 of a slightly different configuration to the legs 8 as previously described. Each leg 16 initially extends substantially vertically downwards from the lower collar 1, each leg being engaged within a recess formed in the lower annular face of collar 1. At a point below the collar 1, each leg 16 is provided with a perpendicular bend to form a substantially horizontal leg portion 17, each leg portion 17 is similar to the leg portions 9 as previously described and each leg 16 is provided with a further substantially vertical leg portion 10 as previously described. It should however be understood that legs 5 or 16 and legs 8 are intended to be releasably secured in recesses 4 and 7 respectively, but could also be permanently fixed.

Figure 4:
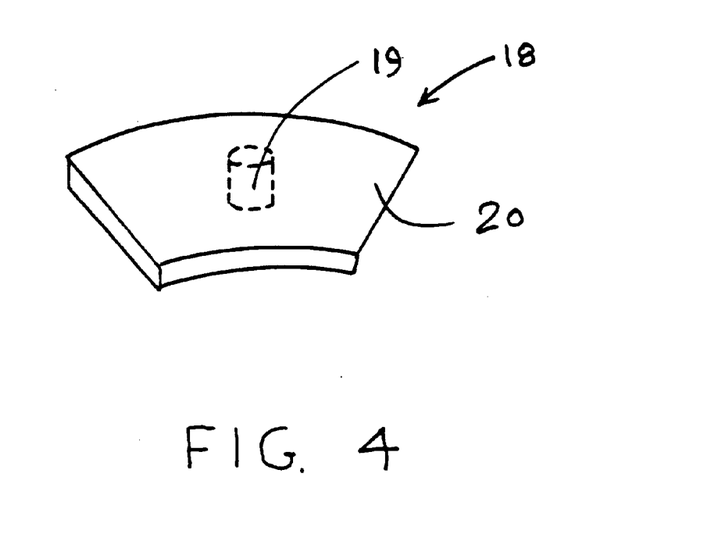
FIG. 4 is a perspective view of part of the support device illustrated in FIG. 1.

FIG. 4 illustrates a resiliently deformable element 18. Element 18 takes the form of a sector of an annular disk of resiliently deformable material. A small spigot 19 extends substantially perpendicular from flat face 20 of element 18.

Figure 5:
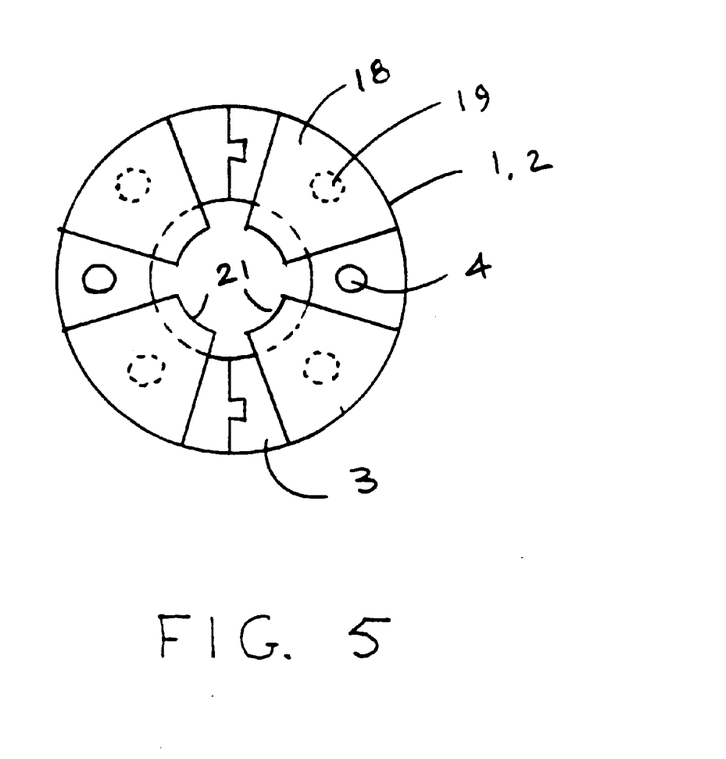
FIG. 5 is a plan view of part of the support device illustrated in FIG. 1.

As can be seen from FIG. 5, a plurality of resiliently deformable elements 18 may be secured to the upper annular face 3 of a collar such as, for example, either lower collar 1 or additional collar 2 of the embodiment of FIG. 1. Each spigot 19 is received within a recess 4 formed in the upper annular face 3. Each resiliently deformable element 18 is situated such that inner arcuate edges 21 thereof define a substantially circular aperture through which a pole such as the stem of a plant or the trunk of a tree may pass. Each arcuate edge 21 may engage the periphery of a stem or trunk. In this way, the resiliently deformable elements 18 may provide support to the stem or trunk whilst allowing limited movement of the stem or trunk and to accommodate a small change in its dimensions, for instance due to growth.

Figure 6:
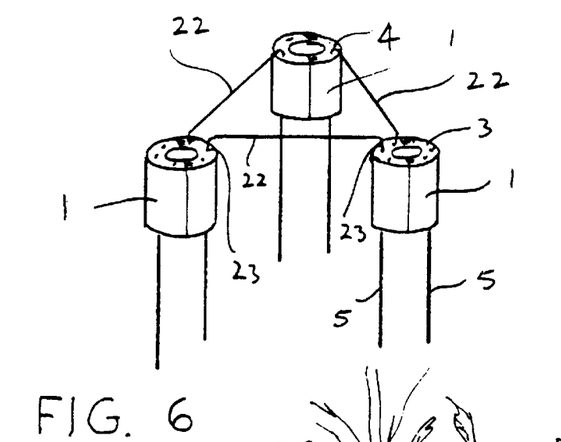
FIG. 6 is a perspective view of an alternative embodiment of the support device illustrated in FIG. 3.

FIG. 6 illustrates a plurality of collars 1 in a substantially horizontal array. Each pair of neighbouring collars 1 are connected via an elongate connecting member 22. Each connecting member 22 has a substantially horizontal main central portion and substantially vertically downwardly extending end portions 23. Each end portion 23 is received within a recess 4 formed in the upper annular face 3 of collar 1. The collars are supported on vertical straight legs 5. A bushy plant may be supported by this structure or a single stem plant by one collar and associated legs 5.

Figure 7:
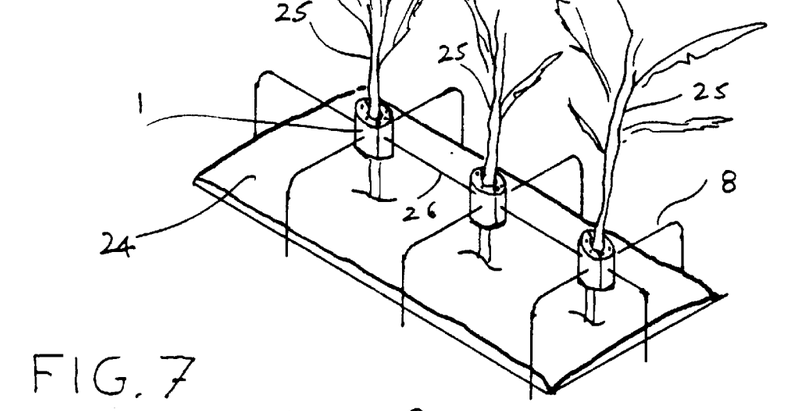
FIG. 7 is a perspective view of an alternative array of support devices as illustrated in FIG. 1.

FIG. 7 illustrates a plurality of collars 1 in a substantially horizontal array being positioned above a conventional growbag 24. Each collar 1 is shown providing support to a stem 25 of a young plant having its roots in the soil contained within the growbag 24. The collars are supported by legs 8. Each pair of neighbouring collars 1 are connected via a substantially horizontal elongate connecting member 26. Each end of connecting member 26 is received within a recess 7 formed in the outer surface of each respective neighbouring collar, or apertures 4 in the upper annular face 3 as in FIG. 6.

The use of connecting members 22, and 26 is intended to provide the support device with increased rigidity when a plurality of collars are used in an array.

Figure 8:
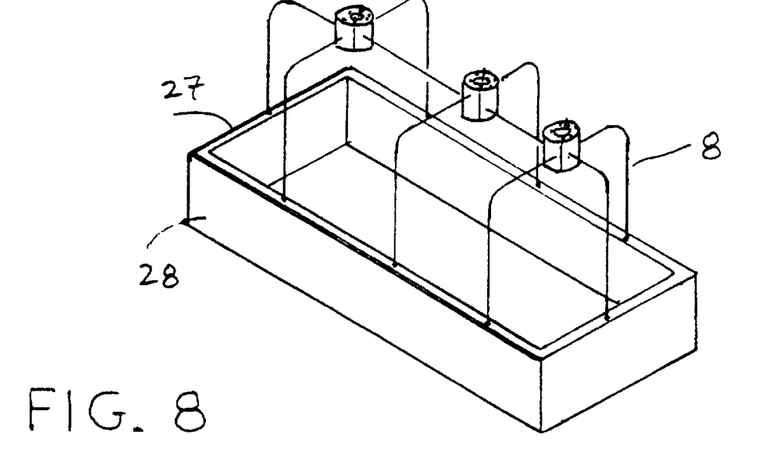
FIG. 8 is a still further alternative array of support devices as illustrated in FIG. 1.

FIG. 8 illustrates a support device substantially similar to that illustrated by FIG. 7, the lower ends of each leg 8 being secured to an upper edge 27 of a planting box 28. For the illustrations of FIGS. 7 and 8 the collars 1 have been shown supported by legs 8. Alternatively the collars could be supported by legs 16 as in FIG. 3 with the connecting members 26 received in recesses 4. It should also be understood that legs 8 and 16 and connecting members 22 and 26 can have a cross section of any geometrical shape provided recesses 4 and 7 have the same shape.

Figure 9:
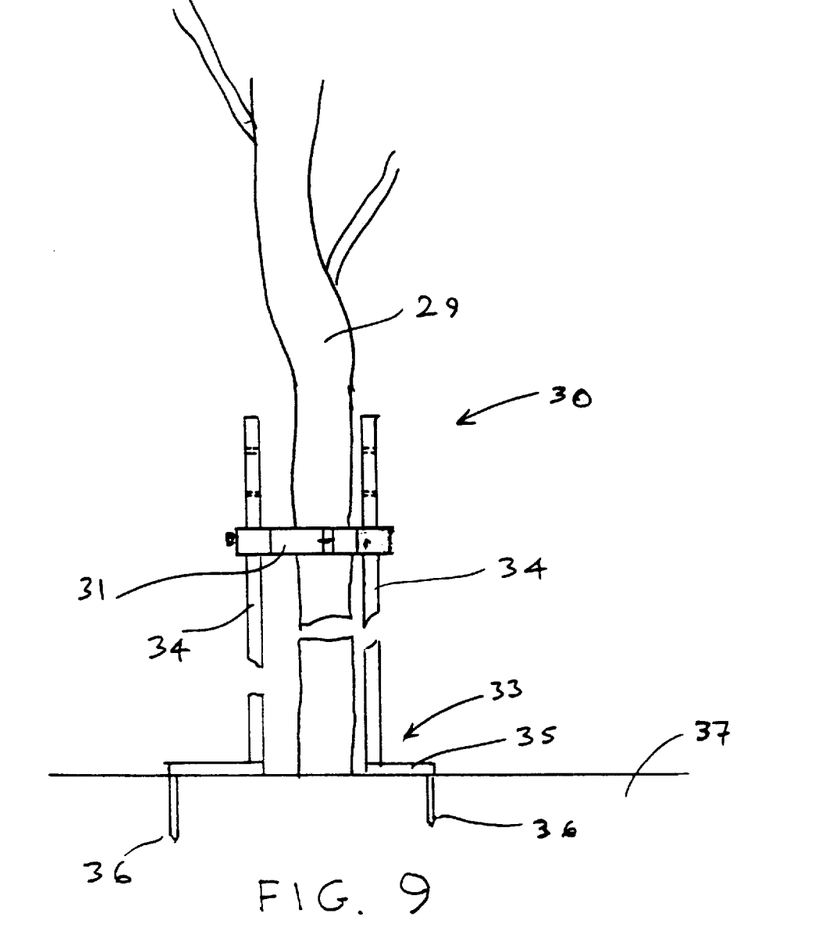
FIG. 9 is a side view of an alternative embodiment of the support device of the invention.
Figure 10:
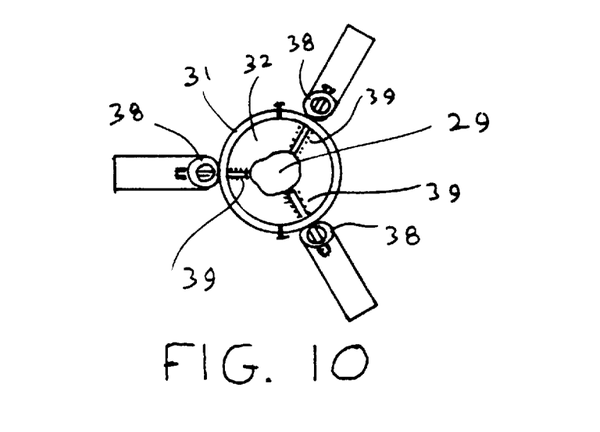
FIG. 10 is a plan view of the support device illustrated in FIG. 9.

FIG. 9 and 10 both illustrate a further embodiment to the present invention which is shown providing support to the trunk 29 of a young tree. It is to be appreciated however, that this embodiment may be used to support any substantially vertical pole. A frame structure 30 is provided which comprises an annular collar 31 comprising two half segments releasably connected together and defining a central passage 32 therethrough. A plurality of legs 33 are provided, each leg 33 having a substantially vertical leg portion 34, and a lower horizontal leg portion 35. Each horizontal leg portion 35 extends radially outwardly from the axis of collar 31 and terminates with a downwardly depending spike 36 which may be embedded in the ground 37 to anchor the frame structure 30 in position around the trunk 29.

As may be seen more clearly in FIG. 10, the collar 31 is provided with a plurality of smaller annular elements 38, each annular element 38 defining a substantially vertical central passage therethrough, and being secured to the periphery of collar 31. Each annular element 38 is adapted to slidably receive a respective vertical leg portion 34.

Figure 11:
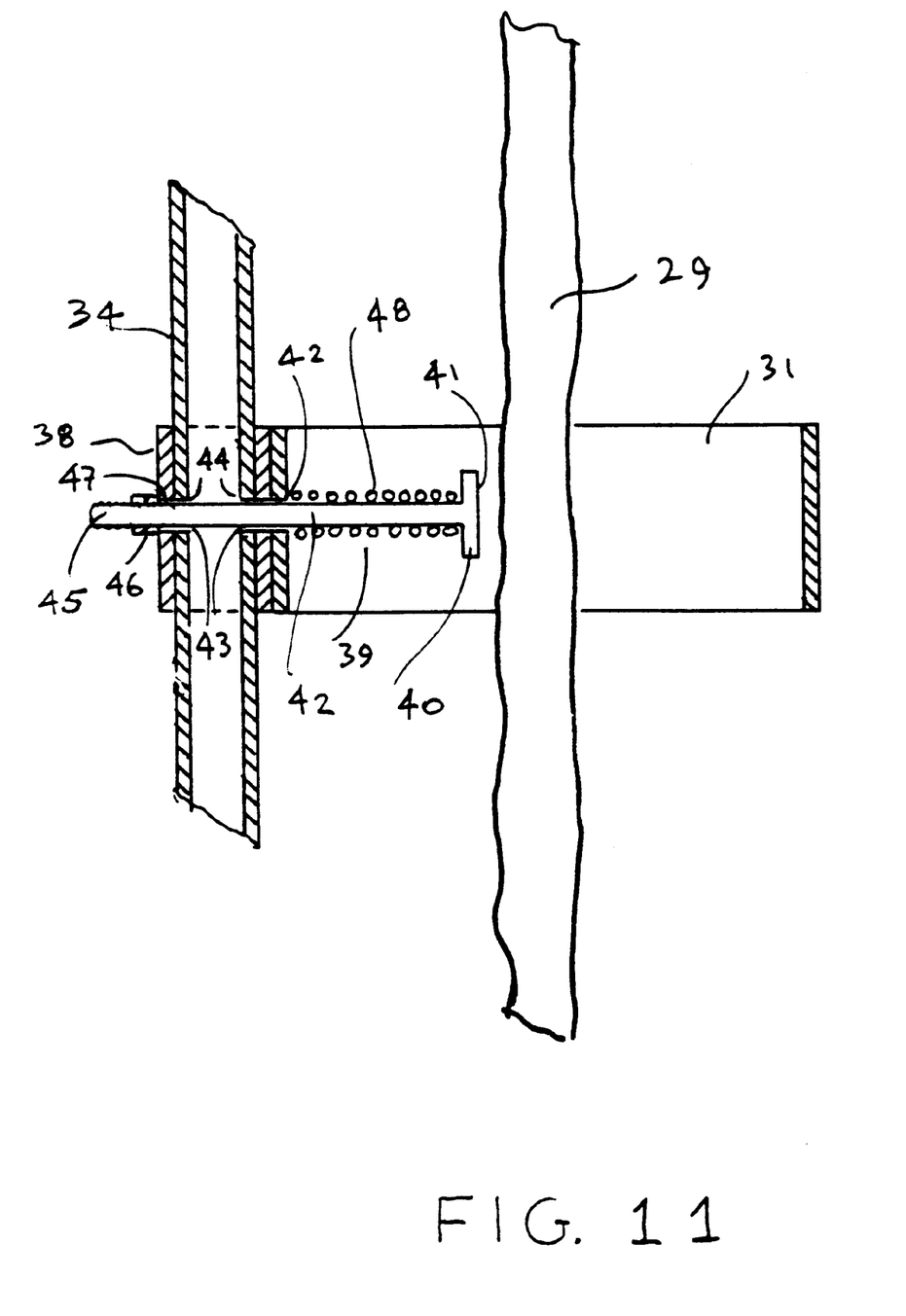
FIG. 11 is a sectional view of part of the plan support device illustrated in FIGS. 9 and 10.

The collar 31 is provided with a plurality of equi-angularly spaced radially extending elongate plungers 39, illustrated more clearly in FIG. 11. Each plunger 39 has a head portion 40 at its inner end, the head portion 40 defining an inner flat face 41 for engagement with the trunk 29. The shank 42 of plunger 39 extends substantially radially outwardly passing through aperture 42 formed in the collar 31, and subsequently through radially aligned apertures 43 formed in each annular element 38 and through corresponding apertures 44 formed in each vertical leg portion 34. In this way, each plunger 39 serves to releasibly secure the corresponding vertical leg portion 34 within the central passage defined by each annular element 38, thereby releasibly securing the collar 31 in a position vertically above the lowermost ends of each leg 33.

Each plunger 39 has a threaded portion 45 at its outermost end, threaded portion 45 being threadedly engaged with a nut 46, the nut 46 having an inwardly directed surface 47 engaged with the collar 31 via annular element 38. A helical spring 48 is positioned around the shank 42 of each plunger 39, one end of said helical spring being attached to the inner end of plunger 39, the other end of helical spring 48 being engaged with collar 31. In this way, each plunger 39 operated as a radially inwardly biased supporting element to provide support to a pole or trunk 29 whilst accommodating a small change in the dimensions of the pole or trunk 29, for instance due to the trunk's growth.

Figure 12:
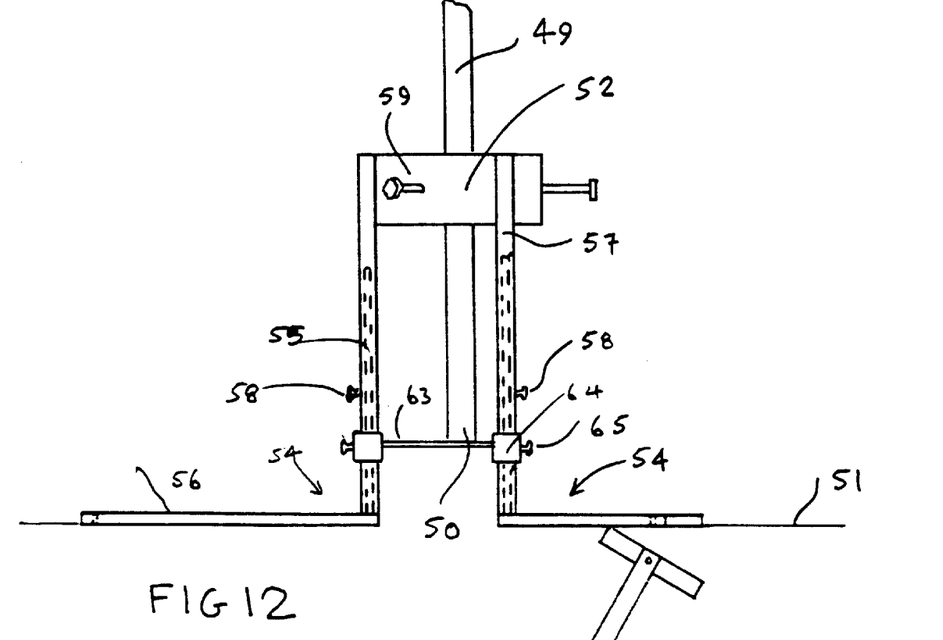
FIG. 12 is a side view of a further embodiment of a support device of the invention.
Figure 13:
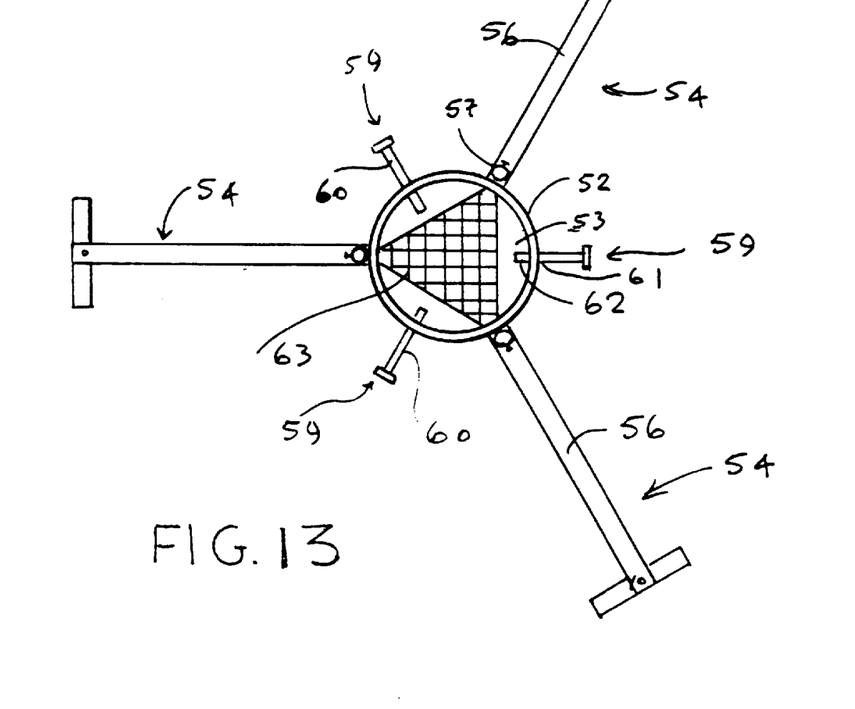
FIG. 13 is a plan view of the support device illustrated in FIG. 12.

Turning now to FIGS. 12 and 13 of the drawings, a further embodiment of the present invention is illustrated, supporting a substantially vertical pole 49, such that the lower end 50 thereof is positioned above ground level 51. An annular collar 52 is provided, defining a central passage 53 therethrough. The collar 52 is associated with a plurality of legs 54 each of which has a substantially vertical portion 55 and a radially outwardly extending horizontal portion 56 the lower surface of which rests upon the ground 51.

Collar 52 is provided with a plurality of elongate vertically downwardly extending tubular elements 57, each of which is secured to the outer surface of collar 52. Each tubular element 57 is adapted to slidably engage a corresponding vertical leg portion 55, and is provided with a radially orientated threaded screw 58 engageable with an aperture therein. Each threaded screw 58 thereby serves as means to releasibly engage each vertical leg portion 55 within the corresponding tubular element 57, thus enabling the vertical position of collar 52 to be adjusted.

Collar 52 is provided with a plurality of radially extending locating elements 59, each of which comprises a threaded shaft 60 threadedly engaged within an aperture 61 formed in collar 52. In operation, each locating element 59 may be radially adjusted such that its inner end 62 is engaged with pole 49, thereby locating pole 49 substantially centrally within channel 53 and providing support to pole 49.

A horizontal flat plate 63 extends substantially across channel 53 at a position vertically below collar 52. Flat plate 63 serves as mounting means, to engage the lower end 50 of pole 49 and to support lower end 50 in a position vertically above the lowermost end of legs 54. Flat plate 63 is associated with a plurality of annular elements 64, each of which defines a substantially vertical aperture therethrough. Each annular element 64 is adapted to slidably receive a corresponding tubular element 57, and is provided with a radially orientated threaded screw 65 engaged within a aperture therein. Each threaded screw 65 thereby serves as means to releasibly engage a respective tubular element 57 within annular element 64, thus providing means to adjust the vertical position of plate 63.

Figure 14:
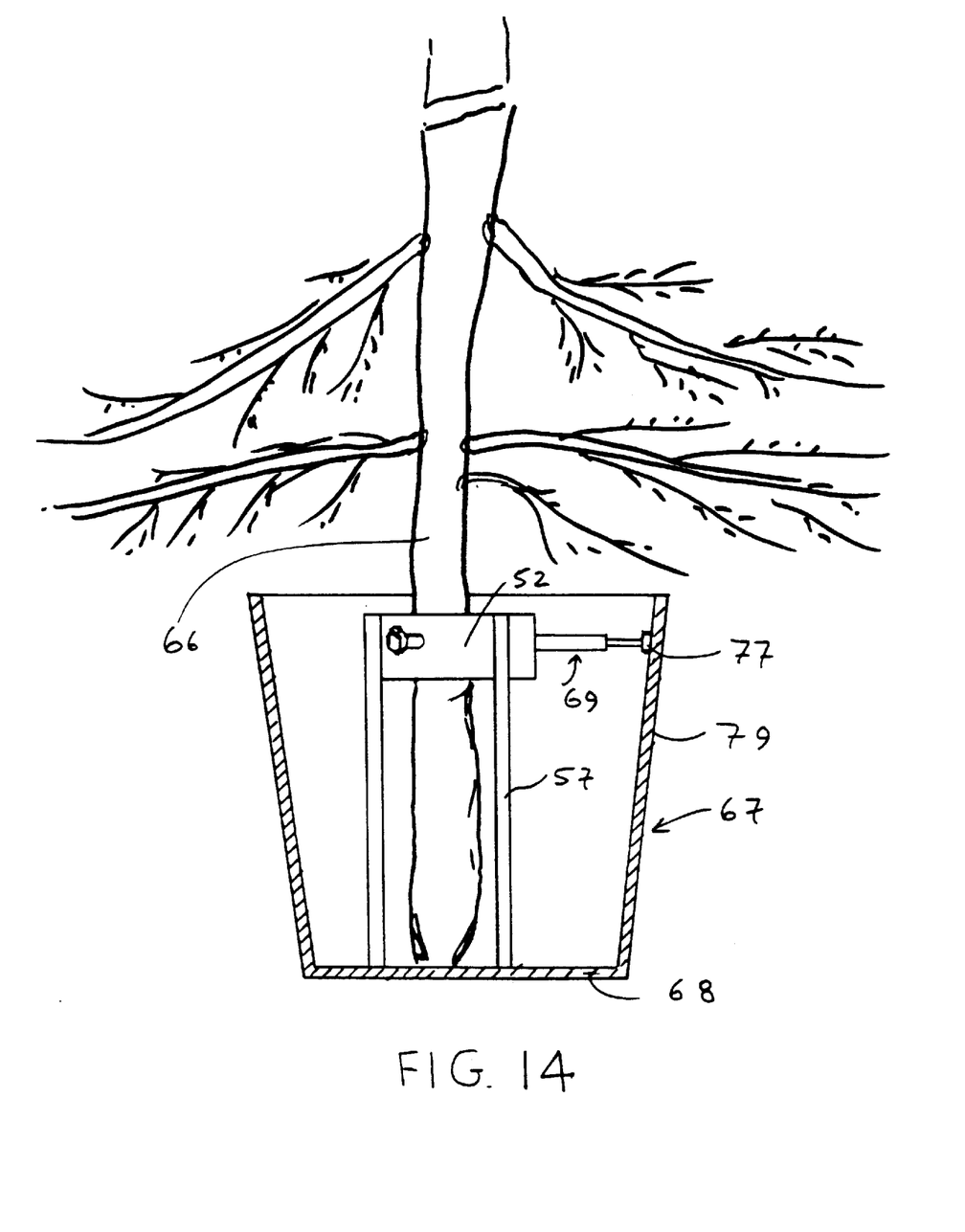
FIG. 14 is a side view of a further embodiment of the support device of the invention.

A further embodiment of the present invention is illustrated in FIG. 14, in which a device substantially similar to that illustrated in FIG. 12 is shown providing support to the trunk 66 of a small tree standing in an open-topped receptacle 67. In this application, the legs 54 and mounting plate 63 are removed, the collar 52 being supported at a position vertically above the base 68 of receptacle 67 by the plurality of tubular elements 57, each of which serves as a leg. At least two of the locating elements 59 are removed and replaced by radially outwardly extending arm 69 which serves as spacing means to locate the support device within receptacle 67.

Figure 15:
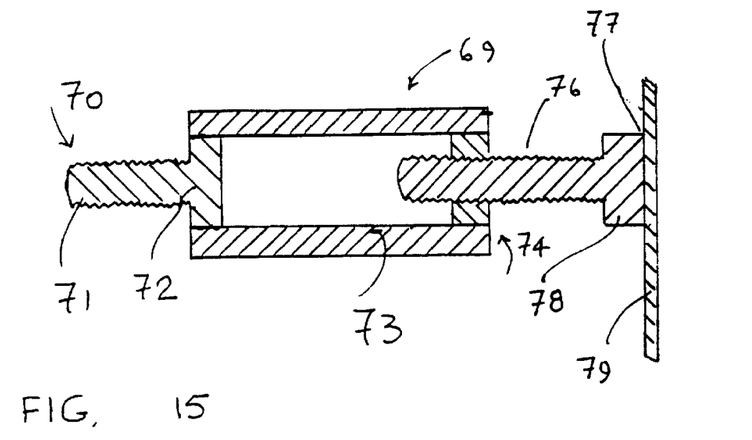
FIG. 15 is a sectional view of part of the support device illustrated in FIG. 14.

One configuration of each extending arm 69 is shown more clearly in FIG. 15. At the inner end 70 of extending arm 69, a threaded shaft 71 is provided, which effectively replaces locating element 59, threaded shaft 71 being threadedly engageable with a corresponding aperture 61 in collar 52. The outermost end 72 of threaded shaft 71 is secured to a radially outwardly extending elongate first arm portion 73. Arm portion 73 is substantially tubular in form carrying at its outer end 74 a threaded aperture 75. Engageable within threaded aperture 75, is a second threaded arm portion 76 terminating at its outer end 77 with a head portion 78. Head portion 78 is engageable with an upwardly extending side wall 79 of receptacle 67. By threaded adjustment of arm portion 76 within threaded aperture 75, the effective length of arm 69 may be adjusted.

Figure 16:
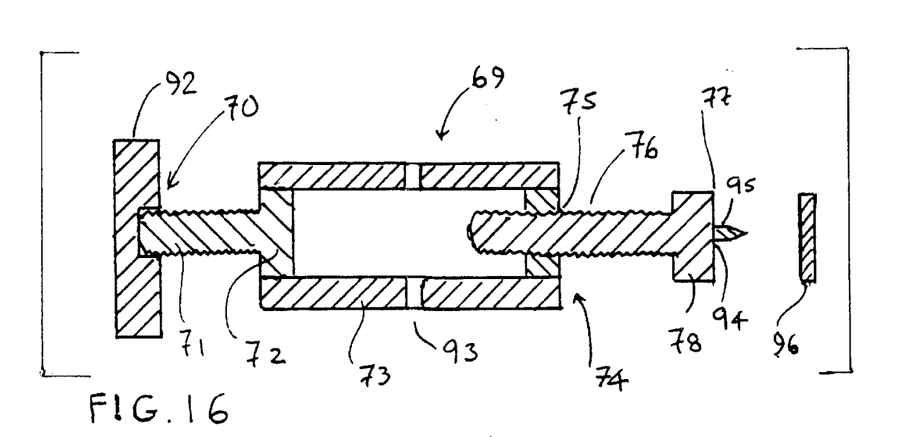
FIG. 16 is a sectional view corresponding to FIG. 15, showing two alternative arrangements of part of the support device illustrated in FIG. 14.

An alternative configuration of arm 69 is illustrated in FIG. 16. The inner end 70 of threaded shaft 71 is received within an aperture formed in a substantially vertical length of tube or bar 92, which in turn engages the outer surface of the trunk 66, thereby providing superior vertical support for the trunk 66 or tube 89.

Tubular arm portion 73 may be provided with a diametrical throughbore 93 to receive part of a key, bar or the like, thereby providing an increased lever with which to rotate arm portion 73.

In the case of side wall 79 of the receptacle 67 being constructed from a soft material such as wood, the head portion 78 of arm portion 76 may be provided with a small axial recess 94 adapted to receive small spike 95 sharpened at its outermost end. The spike 95 may be forcibly pressed into the softwall 79 thereby securely locating the outer end 77 of arm 69. In this mode of operation, the need for legs 57 is reduced, and in fact these may be removed.

In the case of the side wall 79 being constructed from a hard material, such as ceramic, the head portion 78 of arm portion 76 may be provided with a non-slip resiliently deformable plastic pad 96, adhesively bonded thereto in place of spike 95. As the length of arm 69 is increased to locate the trunk 66 substantially centrally within the receptacle, the plastic pad 96 engages the side wall 79 and due to its non-slip nature again provides secure location for the outer end 77 of arm 69.

Figure 17:
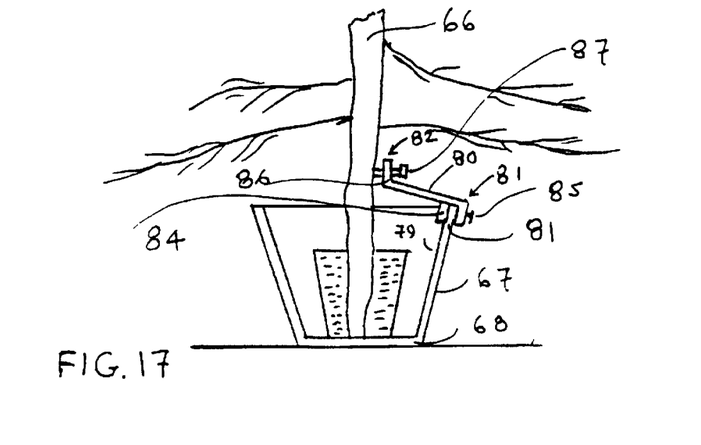
FIG. 17 is a side view of a further embodiment of the support device of the present invention.

FIG. 17 illustrates a further embodiment of the present invention which again serves to provide support to a vertical pole such as the trunk 66 of a tree within an open-topped receptacle 67. A plurality of equi-angularly spaced substantially elongate arms 80 are provided (only one being illustrated for reasons of clarity). Each arm 80 extends from its outer end 81 located adjacent an upper edge 81 of side wall 79 to its inner end 82 at a position adjacent the trunk 66.

At the outer end 81 of arm 80, a pair of spaced-apart downwardly depending tongues 83, 84 are provided defining a space therebetween adapted to engage the upper edge 81 of side wall 79. The outermost tongue 83 is provided with a threaded screw 85 threadedly engageable within an aperture therein, threaded screw 85 serving as means to releasibly secure arm 80 to upper edge 81.

The inner end 82 of arm 80 is provided with a substantially vertically extending flat plate 86, having a threaded aperture formed therein. A further threaded screw 87 is threadedly engaged within said aperture, screw 87 being substantially horizontal and engageable with the trunk 66.

Figure 18:
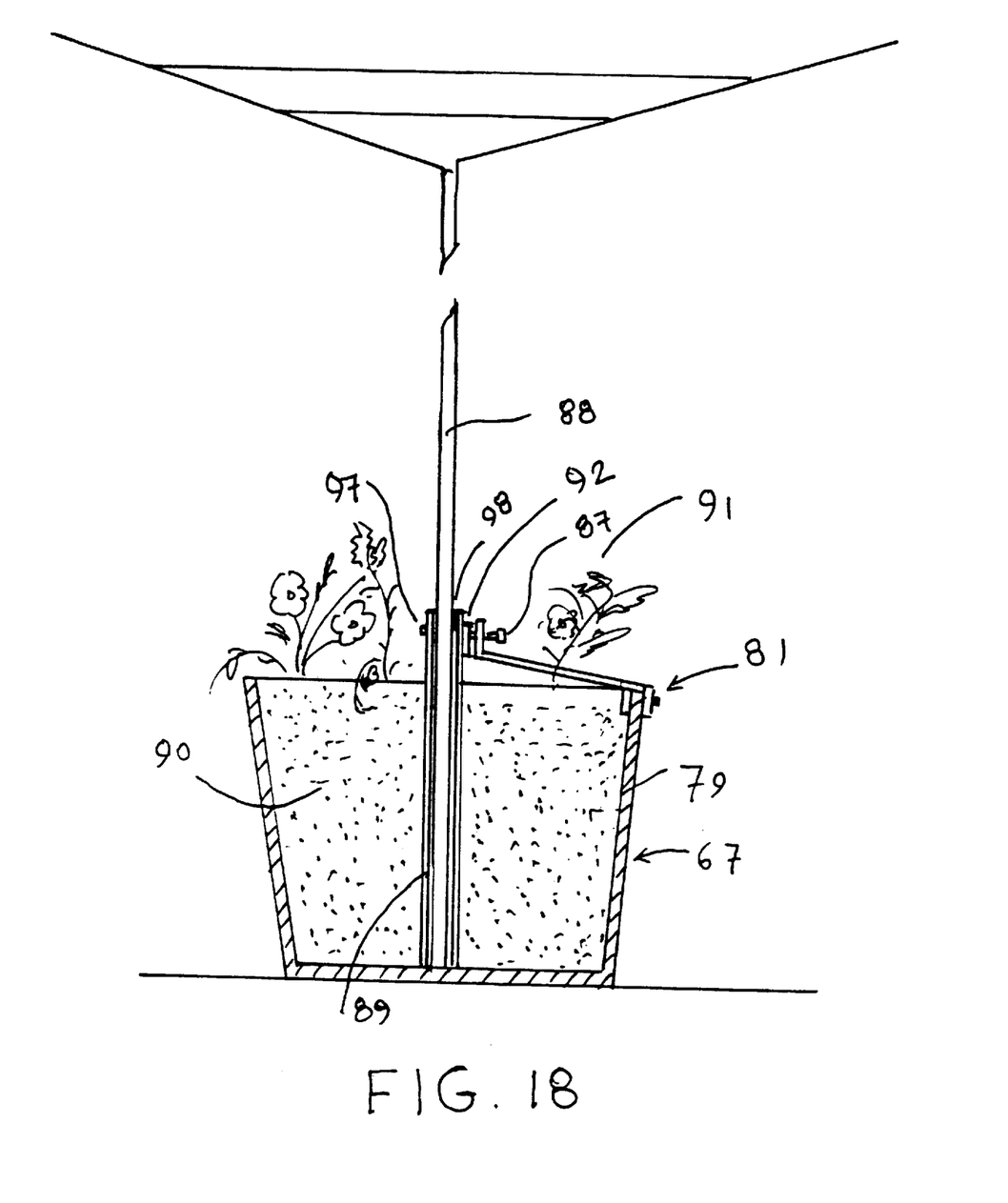
FIG. 18 is a side view of the support device illustrated in FIG. 17, shown in an alternative application.

FIG. 18 illustrates the embodiment described immediately above in use to support the central shaft 88 of a conventional rotary clothes line within an open-topped receptacle 67. It is to be appreciated however, that this embodiment of the present invention may also be used to support the pole of an umbrella within an open-topped receptacle 67. A length of central tubing 89 is located substantially centrally within receptacle 67 such that said tubing projects above the upper edge 82 of side wall 79. The surrounding space within receptacle 67 is packed with stones, sand or earth 90 thereby securing the tubing 89 therein and adding weight to the receptacle for stability. In the case of earth 90 being used, plants or flowers 91 may be planted in the receptacle thereby adding to the aesthetic quality of the support device.

In this mode of operation, it may be found that, since the pole 88 is only loosely received within tube 89, pole 88 may tilt slightly thereby making the entire assembly unstable. In order to alleviate this problem, it is proposed to provide a thumbscrew arrangement 97 at the upper end of tubing 89, threadedly engaged within a radial aperture therein. Thumbscrew 97 engages the surface of pole 88 thereby laterally securing, the pole within tubing 89. Additionally, a locating element 98 may be provided within tubing 89 and opposite to thumbscrew 97 to ensure that when laterally secured, the pole 88 is central within tubing 89.

A substantially vertical length of metal tube or bar 92 may also be provided which engages the tubing 89 over a substantial vertical length to increase stability. Tube or bar 92 is provided with an unthreaded recess in its outer surface, said recess being adapted to receive the innermost end of screw 87.

For the application shown in FIG. 18, the support device could be that shown in FIG. 14 with arm 69 as in FIG. 16.

What is claimed is:

1. A support device for supporting a substantially vertical pole, said support device comprising a frame structure carrying a plurality of radially inwardly biassed supporting elements, each of said supporting elements being engageable with said pole to provide support to the pole whilst accommodating a change in dimensions of the pole, the frame structure comprising a collar comprising a central passage therethrough, a plurality of annular elements attached to the collar where each annular element has an aperture therethrough and a plurality of legs, the legs being adapted to support said collar with the central passage thereof substantially vertical, the collar being positioned above the lowermost ends of the said legs; and each of said supporting elements comprising a radially extending elongate plunger slidably engaged within an aperture in the collar and within a radially aligned said aperture of said annular element communicating with said collar, each plunger having an outer and an inner end, the inner end being engageable with said pole and being associated with a spring to bias the plunger inwardly.

2. A support device according to claim 1, wherein said spring is a helical spring positioned around said plunger, one end of said helical spring being attached to the inner end of said plunger, the other end being engaged with said collar.

3. A support device according to claim 1 or claim 2, wherein at least the outer end of said plunger is threaded and threadedly engaged with a nut, the nut having an inwardly directed surface engaged with said annular element.

4. A support device for supporting at least one substantially vertical pole, said support device comprising a collar defining a central passage therethrough, said collar comprising at least two collar elements, each element comprising a sector of said collar having a pair of substantially flat radially and longitudinally extending faces each engagable with the corresponding flat face of an adjacent collar element, the elements being associated with securing means comprising at least one tab projecting from each said flat face of each said collar element, the or each tab being engageable within a corresponding recess formed in each said corresponding flat face of an adjoining collar element to releasibly secure the said collar elements together, and a plurality of legs communicating with the said collar elements, the legs being adapted to support said collar with the central passage thereof substantially vertical, the collar being positioned above the lowermost ends of said legs.

5. A support device according to claim 4, further comprising at least one resiliently deformable element secured to said collar, the or each resiliently deformable element having at least one surface adapted to be in contact with said pole to provide support to the pole whilst allowing limited movement of pole and to accommodate a small change in dimension of the pole.

6. A support device according to claim 5, wherein a plurality of said resiliently deformable elements are attached to the collar in annular configuration, there being a radial cut therein to facilitate figment around said pole.

7. A support device according to any one of claims 4 to 6, comprising a plurality of said collars in a substantially horizontal array, to provide support to a plurality of substantially vertical poles.

8. A support device according to claim 7, wherein each collar is connected to at least one neighbouring collar via a connecting member.

9. A support device according to claim 4 or claim 8, wherein at least one additional collar is provided and is disposed above at least one of the or each collar.

10. A support device according to claim 9, wherein the or each additional collar is connected to the collar immediately therebelow via a connecting member.

11. A support device for supporting a substantially vertical pole within an open topped receptacle which has at least one upwardly extending side wall, the device comprising a collar defining a central passage therethrough, and a plurality of legs, the legs being adapted to support said collar with a central passage thereof substantially vertical, the collar being positioned above the lowermost end of said legs, the collar being provided with spacing means comprising at least one radially outwardly extending arm, said arm being engageable with the or each side wall, to locate the support device within said receptacle, the or each arm being provided with adjusting means comprising a substantially elongate first arm portion and a second threaded arm portion, said second threaded arm portion being threadedly engageable within said elongate first arm portion, to adjust the length of the or each arm, and said first arm portion being provided with a diametrical throughbore adapted to receive a lever.

12. A support device according to claim 11, wherein the or each outwardly extending arm is provided with a non-slip pad at the outer end thereof adapted to engage the or each side wall and to prevent relative movement therebetween.

13. A support device according to claim 11, wherein the or each outwardly extending arm is provided with a radially outwardly directed spike adapted to engage and penetrate the or each side wall to prevent relative movement therebetween.

14. A support device according to claim 11, 12 or 13 wherein locating means are provided to locate and engage the said pole substantially centrally within the said collar.

15. A support device according to claim 14, wherein said locating means comprises a plurality of radially extending threaded shafts, threadedly engageable with said collar.

* * * * *